March 5, 1968
F. I. LEWIS ET AL
3,371,736
SAFETY BELT SYSTEM
Filed Dec. 8, 1965
2 Sheets-Sheet 1
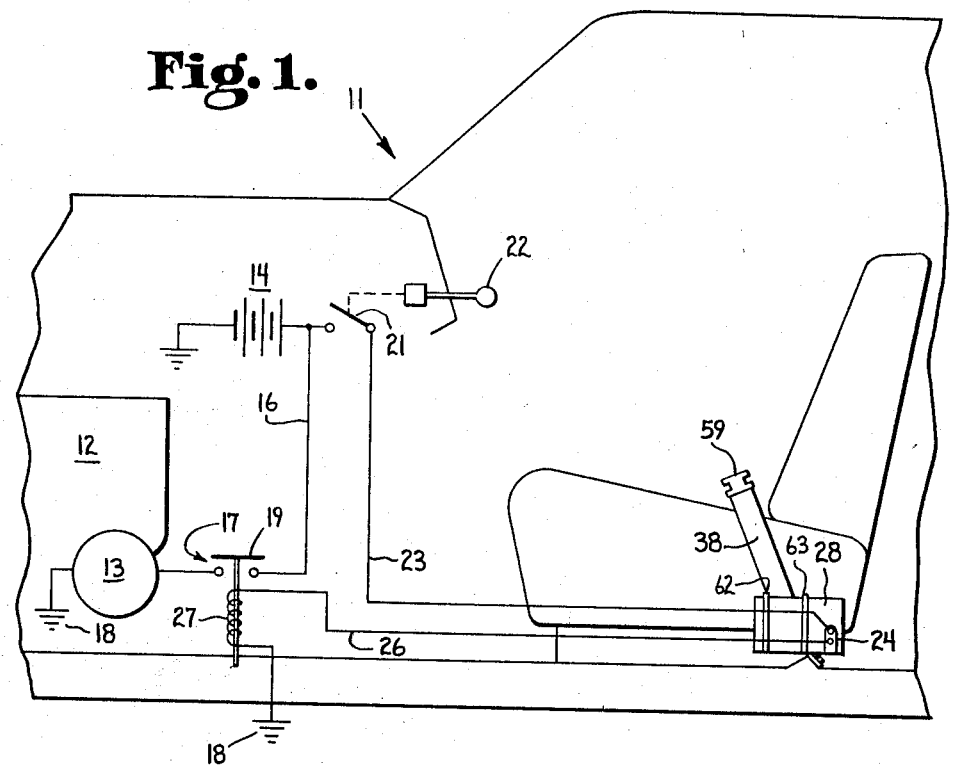
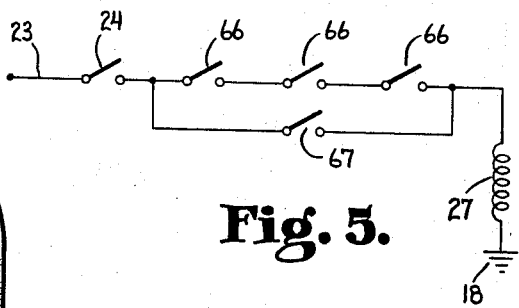
Fig. 5.
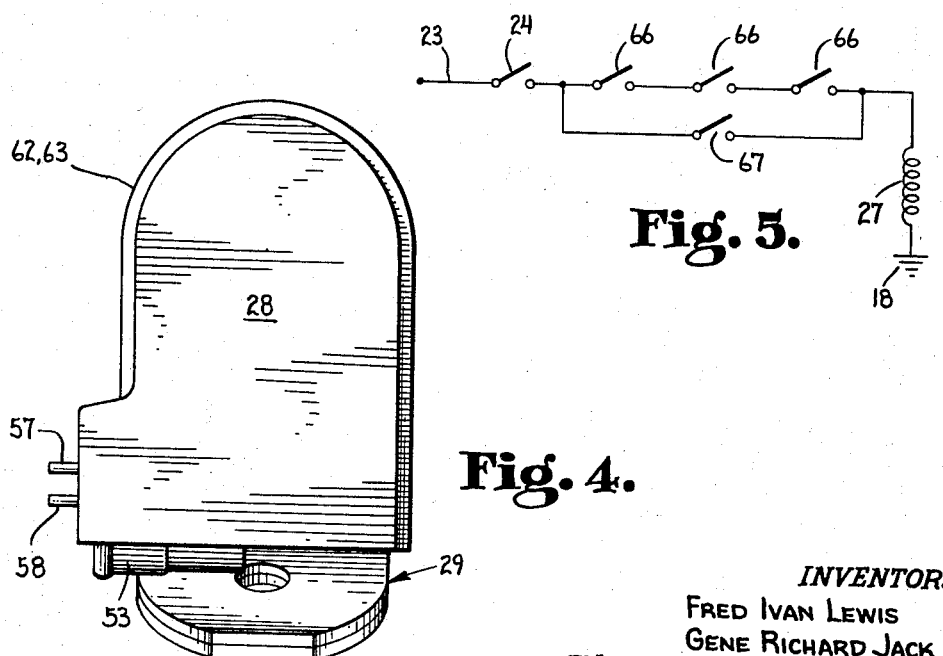
Fig. 4.
INVENTORS.
FRED IVAN LEWIS
GENE RICHARD JACK
BY Lockwood, Woodard, Smith & Weikart
Attorneys

INVENTORS.
FRED IVAN LEWIS
GENE RICHARD JACK

United States Patent Office 3,371,736
Patented Mar. 5, 1968

3,371,736
SAFETY BELT SYSTEM
Fred I. Lewis, 2810 E. 10th St. 46017, and Gene Richard Jack, 1418 Cottonwood Drive 46012, both of Anderson, Ind.
Filed Dec. 8, 1965, Ser. No. 512,453
3 Claims. (Cl. 180—82)

ABSTRACT OF THE DISCLOSURE

A spring wound safety belt retractor spool for retracting a belt by winding thereon. A cam mounted on a screw threadedly received by the spool for linear movement of the cam by rotation of the spool. A switch having an operating arm movable by the cam to open the switch when the belt is wound on the spool.

Background and description

This invention relates generally to passenger safety in motor vehicles, and more particularly to a system which necessitates the fastening of a safety belt in a vehicle before the vehicle can be operated.

It is well known that the proper use of safety belts in automobiles and other automotive vehicles greatly reduces the chance of death or injury in the event of an accident involving the vehicle. As a result, more and more vehicles are being equipped with safety belts. Obviously, in order for a safety belt to serve its purpose, it must be fastened around the passenger.

Some passengers, for one reason or another, neglect to use a safety belt. Others will gladly use a safety belt but may occasionally forget to fasten it. In either case, such persons are in danger of serious injury or death in the event of an automobile accident.

Various arrangements have been devised to encourage the use of safety belts by passengers. Among these are the arrangements shown in our copending application Ser. No. 346,276 entitled Safety Belt System (now abandoned) and which employs an engine starting circuit which cannot be operated unless the seat belt is fastened.

With the advent of seat belt retractors, it has become desirable to provide some means alternative to that shown in our copending application, and which will be effective to encourage fastening of safety belts.

It is therefore a general object of the present invention to provide apparatus encouraging use of safety belts.

A further object is to provide apparatus and a system which can be easily incorporated with the presently known and widely used components.

A further object is to provide apparatus requiring insignificant extra space in a vehicle, and which is no more noticeable than a conventional seat belt retractor.

A further object is to provide apparatus which can be incorporated in any vehicle.

A further object is to provide apparatus immune to damage or malfunction.

A further object is to provide apparatus achieving the foregoing objects while requiring minimal current, presenting no hazard or inconvenience in use, attainable at low cost, and enabling unfastening of a seat belt, if necessary, without interruption of vehicle engine operation.

Described briefly, a typical embodiment of the present invention incorporates a switch mounted on and operated by seat belt retractor means. This switch is in an engine starting circuit and the retractor means normally keeps this circuit open so long as the retractor keeps the seat belt rolled up. When the seat belt has been unrolled sufficiently for fastening around an operator or passenger, the switch is closed and upon turning of the ignition key, the engine starting circuit is energized.

The full nature of the invention will be understood from the accompanying drawings and the following description and claims:

FIG. 1 is a fragmentary schematic view of an automobile with a seat belt system therein according to a typical embodiment of the present invention.

FIG. 4 is an end view with the housing installed.

FIG. 5 is a schematic diagram of a circuit portion which can be substituted in the circuit of FIG. 1 to extend the control to all safety belts, but permit a manual override by the driver.

Figure 2:
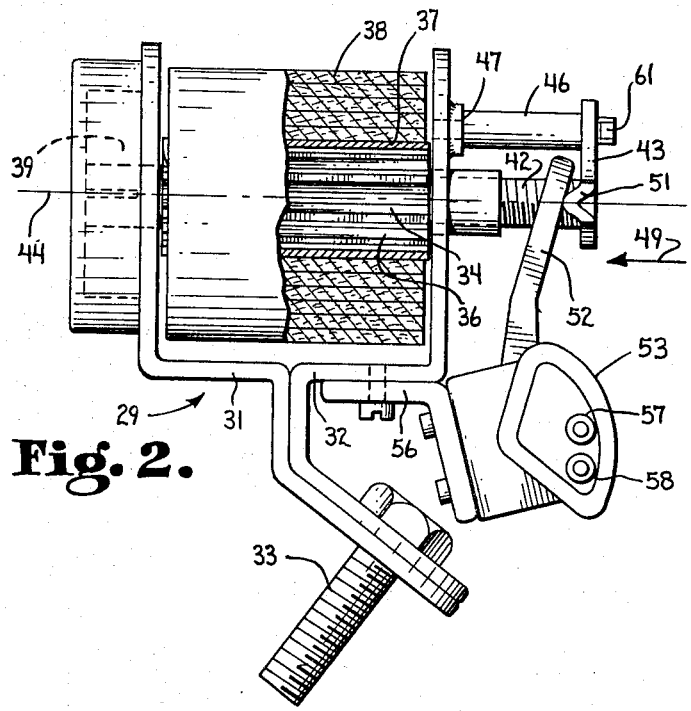
FIG. 2 is an enlarged side elevational view of the seat belt retractor assembly of FIG. 1 and with the housing removed.

Referring now to the drawings in detail, the vehicle 11 has an engine 12 which is operable upon cranking by the electric starting motor 13. This starting motor is operable when energized by electrical energy flowing from the battery 14 through the conductor 16 and through solenoid contacts 17, the circuit being completed through ground 18. To energize the solenoid and close the contacts 17 by the contactor 19 thereof, a switch 21 operated by the ignition key 22 is closed to energize the conductor 23 and, if the switch 24 incorporated according to the present invention is closed, the conductor 26 is thereby energized to energize the solenoid winding 27, the lower end of which is returned to ground 18. When the key switch, which is spring loaded, is released, the switch 21 will open, permitting the contacts 17 to again open and the operation of the starting motor 13 is terminated.

As suggested by the foregoing, it is impossible to energize the starting motor unless the switch 24 is closed and the means whereby this switch is controlled according to the present invention, will now be described.

Figure 3:
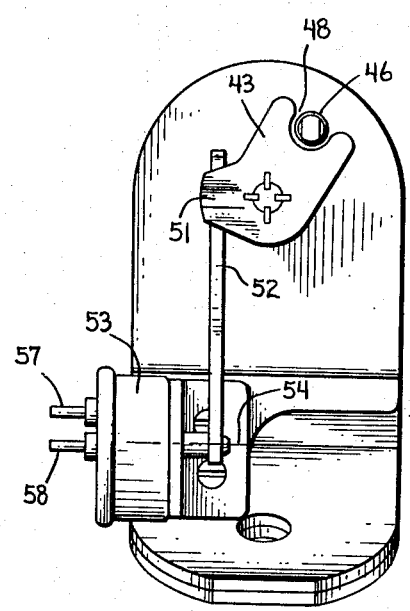
FIG. 3 is an end view thereof.

Referring particularly to FIGS. 2 and 3, in which the housing 28 of FIG. 1 has been removed, the seat belt retractor includes a two piece bracket 29 including the sections 31 and 32 which are secured to the vehicle structure by a bolt 33. A spindle 34 is mounted for rotation on the bracket and may include ribs 36 or other means which cooperate with a belt holder clip 37 to fasten one end portion of a belt 38 to the spindle or spool. At the front end of the bracket is a spring 39 which is wound when the spindle is rotated in one direction and urges the spindle to rotate in the opposite direction. Accordingly, when the belt is pulled out of the housing to a position such as shown in FIG. 1, for example, the spring 39 is wound and is ready to rewind the belt back into the housing as soon as the external force is removed from the belt.

According to the present invention, the spool is provided with an extension thereof which is internally threaded to receive an externally threaded shaft 42 therein. This shaft has a cam plate 43 affixed to the outer end thereof by staking, welding, or other suitable means. The internal and external threads have an axis colinear with the axis 44 of rotation of the spool. A cylindrical elongated post 46 is threadedly received into the bracket 32 at 47 and affixed thereto. This post extends parallel to the axis 44 and fits in a guide groove or notch 48 in the cam plate 43. It prevents rotation of the cam plate on the axis 44 so that, regardless of which direction the spool rotates, the cam plate does not rotate but instead moves in translation either toward or away from the spool. In the illustrated embodiment, the thread and belt winding are such that as the belt is unwound from the spool, the cam screw 42, and therefore the cam 43, are moved in the direction of the arrow 49, which is toward the spool.

It follows that when the belt is again wound on the spool by the spring 39, the cam moves in the opposite direction.

The cam is provided with a boss 51 engaging the switch operating lever arm 52 of the switch 53. This lever arm is pivotally mounted to the switch 53 for pivoting on an axis 54 to open and close the switch. This switch is mounted by the bracket 56 to the bracket portion 32 and is affixed in position as shown. The switch is provided with terminals 57 and 58 which are electrically connected inside the switch by contacts therein when the switch is closed by lever 52, and the terminals are electrically disconnected from each other within the switch when the contacts are opened, again depending on the position of the lever 52. Switches of this configuration are commonly available and frequently used for vehicle stop light control, being operable by some portion of the brake mechanism.

So it is that with the belt rolled up on the retractor as shown in FIGS. 2 and 3, the cam and the switch operating arm are in the position shown and the switch is open. As the belt is pulled out of the retractor the cam moves toward the spool and when the buckle connector 59 of the belt has been pulled near the point where it can be attached to the buckle of the other portion of the belt (not shown), around the passenger, the cam has been moved in far enough to cause the lever 52 to close the switch. In this way, when the belt is fastened around the passenger or driver, the starting circuit can be closed by turning the ignition key to close switch 21 (FIG. 1). Because this is not the ignition circuit, and is only needed for the temporary operation of the starting motor until the engine is started, the engine will continue to run, once started, even if the retractor is allowed to roll up the belt again.

In order to adjust the point of belt roll out at which the switch will be closed, the starting position of the cam can be adjusted. For this purpose, a pair of flats 61 or other tool engaging surfaces, can be provided at the outer end of the post 46 so that it can be unscrewed from the bracket and removed. This will allow the cam screw to be manually turned in or out of the spool while the spool remains stationary. Accordingly, the starting position of the switch lever 52 will be moved in or out, dependent on where the adjusted position of the cam is established. Then the post is again screwed into the bracket and affixed in position to serve its cam guiding function.

The housing 28 is provided with a couple of grooves 62 and 63 to assist in guiding it on to the brackets 31 and 32 so that it can be easily slided down over the retractor cam and switch assembly into the position shown in FIG. 1 where it encloses these components.

It is believed that the foregoing description will make it apparent that the present invention is well adapted to achievement of the objects set out herein. The retractor, cam, and switch assembly can be incorporated on either side of the vehicle and in the most satisfactory location for use by either front or rear seat passengers. It is also possible to connect the switch of each of the retractors in parallel with the switch of each other so that all must be activated before the starting circuit can be closed. In such an instance, however, it is easy to provide a parallel, switchable master circuit branch operable by the switch of the retractor next to the driver so that he can over-ride the control of the other switches and enable starting the vehicle by simply fastening his safety belt. Such a manual over-ride arrangement is shown in FIG. 5 which is a fragment of the circuit of FIG. 1 and switches 66 are those controlled by the retractors adjacent the seats other than the driver's seat. The manual over-ride switch 67 operable by the driver is shown in parallel with this series of switches 66 and, when closed, makes the circuit electrically the same as in FIG. 1.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. For a safety belt system, the combination comprising:
   safety belt retractor means for normally storing a safety belt when the belt is not in use, said retractor means including a spool rotatable by a belt wound thereon, during unwinding of said belt therefrom;
   switch means operable by said retractor means in response to changes in belt storage thereby, said switch means including an operating member mounted to said retractor means;
   a cam connected to said spool means, said cam being engageable with said operating member and responsive to rotation of said spool during unwinding of said belt to move said operating member for closure of contacts of said switch,
   said cam having a mounting shaft threadedly received by said spool, the thread axis being colinear with the rotational axis of said spool, whereby said cam is moved away from said spool as said spool winds said belt and said cam is moved toward said spool as said belt is unwound.

2. The combination of claim 1 and further comprising:
   a guide post fixed in position parallel to said axes and in guiding engagement with said cam and thereby preventing rotation of said cam mounting shaft during rotation of said spool,
   said guide post being movable out of said guiding engagement when desired for adjustment of said cam position with respect to said switch operating member and with respect to the amount of said belt which is unwound from said spool at the time of adjustment.

3. The combination of claim 2 wherein said retractor means includes a mounting bracket for mounting to the vehicle structure, said combination further comprising:
   a housing slidingly received on said bracket and enclosing said spool and the portion of said belt wound thereon and said switch means and said cam and said cam mounting shaft and said guide post.

References Cited

UNITED STATES PATENTS

| | | | |
|---|---|---|---|
| 1,724,912 | 8/1929 | Cubitt et al. | 340—278 |
| 2,488,858 | 11/1949 | Franz. | |
| 2,844,674 | 7/1958 | Anderson | 200—61.16 |
| 3,133,277 | 5/1964 | Hood | 200—61.58 X |
| 3,185,246 | 5/1965 | Maurer | 180—82 |

FOREIGN PATENTS

| | | |
|---|---|---|
| 237,466 | 9/1960 | Australia. |
| 378,424 | 1/1932 | Great Britain. |

KENNETH H. BETTS, *Primary Examiner.*